March 15, 1927.  1,621,217
F. W. PETERS
UNIVERSAL JOINT
Filed April 22, 1925    2 Sheets-Sheet 1
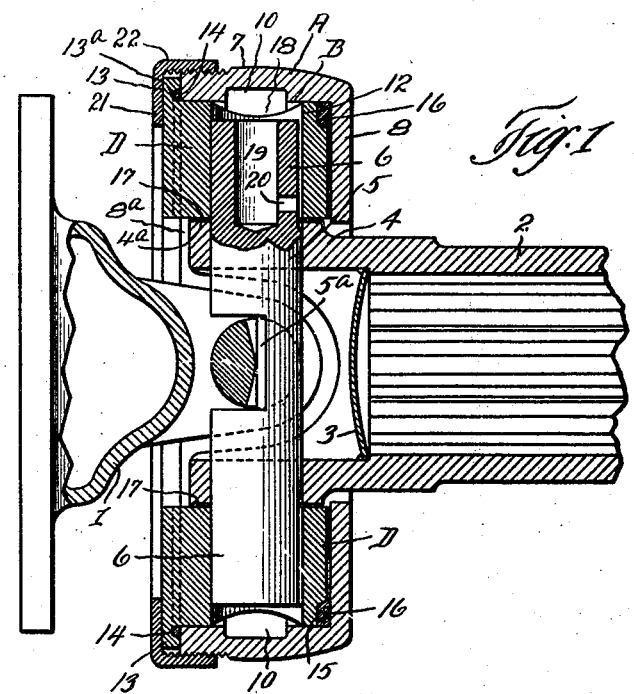
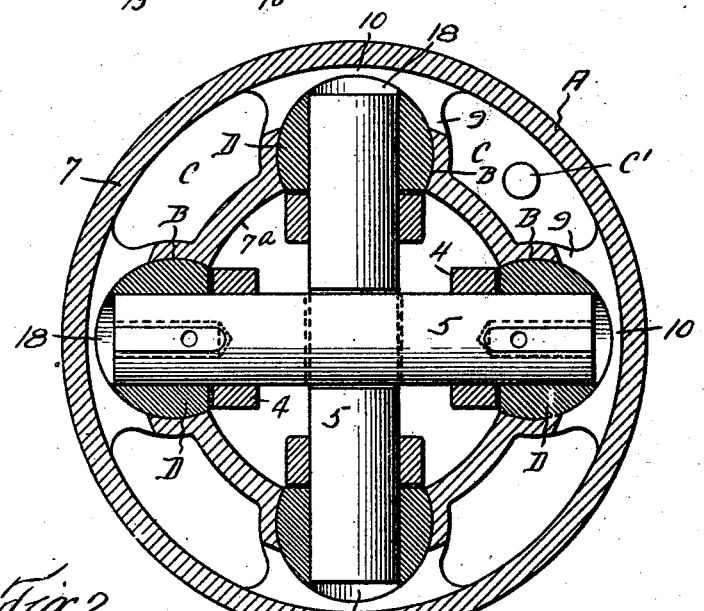

March 15, 1927. 1,621,217
F. W. PETERS
UNIVERSAL JOINT
Filed April 22, 1925  2 Sheets-Sheet 2
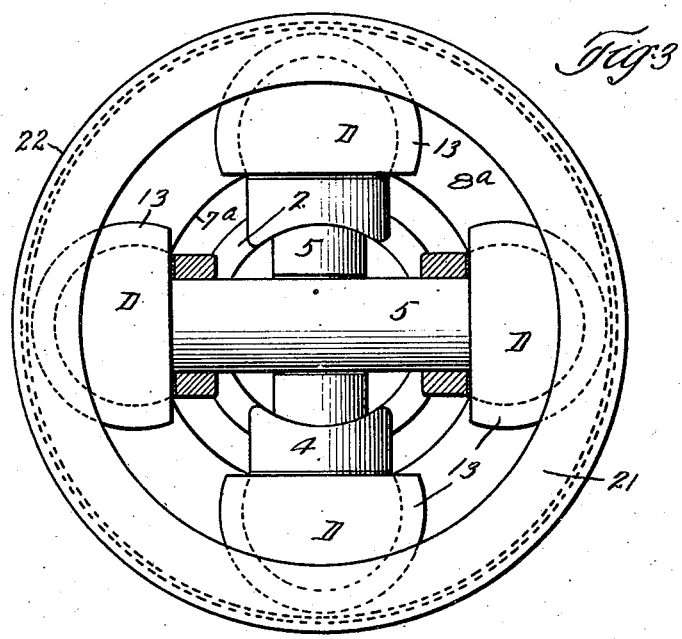
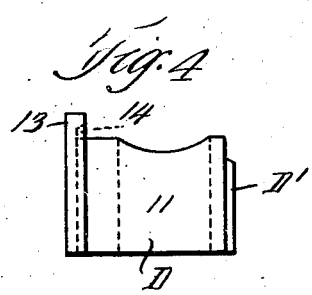
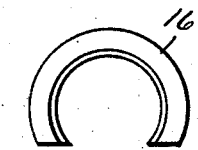
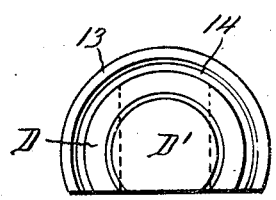
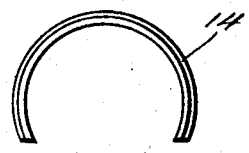
Inventor
Frederick W. Peters,
By
Attys.

Patented Mar. 15, 1927.

1,621,217

UNITED STATES PATENT OFFICE.

FREDERICK W. PETERS, OF CLEVELAND, OHIO, ASSIGNOR TO SPICER MANUFACTURING CORPORATION, OF SOUTH PLAINFIELD, NEW JERSEY, A CORPORATION OF VIRGINIA.

UNIVERSAL JOINT.

Application filed April 22, 1925. Serial No. 24,925.

This invention relates to universal joints, and more particularly to joints of the character wherein the trunnions on the end coupling members are connected with an intermediate hollow lubricant containing ring through bearing blocks which are inserted in such ring transversely of the latter—that is to say, in a direction that is substantially parallel with the axis of rotation of such ring.

A joint of this general character is shown, described and claimed in my application 679,596, filed December 10, 1923.

It is the general purpose and object of this invention to provide a joint of the general character referred to wherein the bearing blocks may be mounted in the ring without the necessity for providing openings in one of the side walls of the latter, with a corresponding reduction in the liability to leakage at these points.

A further object of the invention is to mount the bearing blocks in such manner that the liability to leakage through the openings, by means of which the blocks are inserted into the ring, is reduced to a minimum.

A still further object of the invention is to provide a joint of this character which is simple in construction and cheap of production.

I accomplish the foregoing objects in and through the construction and arrangement of parts shown in the drawings, wherein Fig. 1 represents a sectional elevation of a universal joint embodying my invention; Fig. 2 a central sectional view through the ring, showing the pins and trunnions in elevation; Fig. 3 a sectional elevation of the joint, the view being taken just to the left of the clamping ring 21 on Fig. 1; Figs. 4 and 5 are views in side and end elevation, respectively, of one of the bearing blocks; and Figs. 6 and 7 are details of the washers used at opposite ends of each bearing block.

Describing the various parts by reference characters 1 and 2 denote hubs by means of which the joint is connected to shaft sections (not shown), the hub 2 being shown as adapted for a splined connection wth its shaft section, the outer end of the hub bore being closed by a plate 3. The hubs are provided each with a yoke, the arms 4 of each yoke having a cross pin 5 mounted therein, the outer ends 6 of each cross pin constituting trunnions. Each cross pin is shown as provided with a central recess $5^a$ of slightly greater depth than the radius of such pin, each recess being about 210° in angular extent to accommodate the rocking movements of the pins. The trunnion is adapted to be mounted in bearing blocks carried by and supported within a connecting member in the form of a ring, the ring being indicated generally at A. The ring is preferably made from malleable iron and is provided with an outer cylindrical wall 7, annular side walls 8 and $8^a$ and an inner cylindrical wall $7^a$, the inner wall being segmental.

Formed in the ring thus provided are transversely extending seats B for the bearing blocks. These seats extend through the side wall $8^a$ and toward the opposite side wall 8; and the block-receiving wall of each such seat is a section of a cylinder having a circumferential extent in excess of 180°, whereby the seats permit the blocks to rock therein while preventing radial inward movement of the said blocks.

It will be noted that the space between the outer wall 7 and the segmental inner wall $7^a$ is divided into a plurality of chambers C, said chambers being separated from each other by means of the side walls of the seats B and by the bearing blocks inserted within such seats. Each chamber C is adapted to communicate with the interior of the seats B on each side thereof through large openings 9 formed in the walls of said seats, thereby to lubricate the outer surfaces of the bearing blocks. The chambers C are enabled to communicate with each other and to provide for the circulation of the lubricant by centrifugal action, by means of the ports 10, formed in the outer portions of the seats, said ports forming passages, beyond the trunnions connecting the adjacent chambers C. The ports 10 merge at their inner ends with the openings 9. For the purpose of supplying the chambers with lubricant, one such chamber is provided with a filling opening C' closed by a plug.

Cooperating with the seats B are the bearing blocks, each of which is indicated generally at D, the blocks being so shaped as to fit within the said seats and each having an external wall 11 of the same general contour as the wall of its seat, except as such contour is modified by the extension of the cylindrical radial bore 12 therethrough. Each of the blocks D is provided with a flanged head 13 at one end thereof, each flange having an outer wall concentric with the bearing wall of the block and being of the same angular extent as such bearing wall. Each flange has a groove 13$^a$ therein constituting a segment of an annulus for the reception of a washer 14. The end of each block D which is opposite the flanged head 13 is reduced, as shown at D', providing a segmental angular seat 15 for the reception of a washer 16.

Between each bearing block and the adjacent shoulder 4$^a$ on the adjacent yoke arm, and surrounding each trunnion, is a washer 17.

Each bearing block is provided with a port 18, beyond the trunnion therein, adapted to register with a port 10 and form therewith a continuous passage extending across the end of each trunnion and between the same and the cooperating part of the seat D, the ports 10 and 18 connecting adjacent chambers C. The ports 10 and 18 communicate with a central axial chamber 19 extending inwardly from the outer end of each trunnion, from which chamber a port 20 extends to the seat provided for each trunnion within its bearing block, the ports 20 extending at right angles to the plane of rotation of the ring, as pointed out in my earlier application referred to hereinbefore.

With the parts constructed and arranged as described, the hubs, with their trunnions and the bearing blocks, can be readily applied to the ring by pressing the blocks into their seats, seeing that the washers 14 and 16 are in place. For the purpose of holding the blocks in their seats, I employ with the ring A a clamping ring having a short radially extending flange 21 adapted to engage the outer portions of the blocks D, the said ring having a circumferentially extending flange 22 which is threaded upon the adjacent end of the ring A. By setting up the ring 21, 22, the blocks D will not only be held to their seats, but the flange 21 will exert a clamping pressure upon the outer segment of each block D, maintaining a firm pressure upon the corresponding portions of the blocks D and thereby compacting the washers 14 and 16. While the flange 21 of the clamping ring holds the blocks D to their seats, the direct application of its clamping pressure is upon those portions of the clamping flanges and washers 14 and 16 which are subjected to the maximum centrifugally-exerted pressure of the lubricant.

The shape of the seats B and blocks D enables the blocks to be retained in the seats against radial inward movement, but with the capability of rocking in said seats thereby to facilitate the assembling operation.

By reason of the construction illustrated and described herein, I am enabled to provide a joint of the character referred to hereinbefore, which is simple and economical of production, which will reduce to a minimum the machining operations, and which will reduce to a minimum the liability of the lubricant to leak therefrom.

Having thus described my invention, what I claim is:—

1. In a universal joint, the combination, with a driving and a driven member and trunnions carried thereby, of a hollow lubricant-containing connecting ring for said trunnions, the said ring having seats extending transversely thereof from one side toward and terminating short of the opposite side, bearing blocks for said trunnions adapted to be inserted in said seats, each bearing block having a flange at the outer end thereof with a washer interposed between said flange and the adjacent face of said ring, a washer interposed between the opposite end of each bearing block and the bottom of the seat therefor, and means for securing said blocks in place within said ring.

2. In a universal joint, the combination, with a driving and a driven member and trunnions carried thereby, of a connecting ring for said trunnions, the said ring having seats extending transversely thereof from one side toward and terminating short of the opposite side, bearing blocks for said trunnions adapted to be inserted in said seats, each bearing block having a flange at the outer end thereof with a washer interposed between said flange and the adjacent face of said ring, and means for securing said blocks in place within said ring.

3. In a universal joint, the combination, with a driving and a driven member and trunnions carried thereby, of a hollow lubricant-containing connecting ring for said trunnions, the said ring having seats extending transversely thereof from one side toward and terminating short of the opposite side, bearing blocks for said trunnions adapted to be inserted in said seats, each bearing block having a flange at the outer end thereof with a washer interposed between said flange and the adjacent face of said ring, a washer interposed between the opposite end of each bearing block and the bottom of the seat therefor, and a clamping ring threaded upon the exterior of the connecting ring and having a radial flange adapted to engage the flanges on the said bearing blocks.

4. In a universal joint, the combination, with a driving and a driven member and trunnions carried thereby, of a hollow lubricant-containing connecting ring for said trunnions, the said ring having seats extending transversely thereof from one side toward and terminating short of the opposite side, bearing blocks for said trunnions adapted to be inserted in said seats, each bearing block having a flange at the outer end thereof with a washer interposed between said flange and the adjacent face of said ring, and a clamping ring threaded upon the exterior of the connecting ring and having a radial flange adapted to engage the flanges on the said bearing blocks.

5. In a universal joint, the combination, with a driving and a driven member and trunnions carried thereby, of a hollow lubricant-containing connecting ring for said trunnions, the said ring having seats extending transversely thereof from one side toward and terminating short of the opposite side, the cross section of each of said seats constituting a segment of a circle in excess of 180° with the arc of such segment defined by the intersection of the seat with the inner wall of the ring, bearing blocks for said trunnions having cross sections corresponding in shape to the said seats and adapted to be inserted in said seats, each bearing block having a flange at the outer end thereof, a washer interposed between said flange and the face of the ring adjacent thereto, and means mounted on said ring and cooperating with the said flanges for holding the said blocks to their seats.

6. In a universal joint, the combination, with a driving and a driven member and trunnions carried thereby, of a hollow lubricant-containing connecting ring for said trunnions, the said ring having seats extending transversely thereof from one side toward and terminating short of the opposite side, the cross section of each of said seats constituting a segment of a circle in excess of 180° with the arc of such segment defined by the intersection of the seat with the inner wall of the ring, bearing blocks for said trunnions having cross sections corresponding in shape to the said seats and adapted to be inserted in said seats, each bearing block having a flanged head at the outer end thereof, a washer interposed between said flange and the face of the ring adjacent thereto, and a clamping ring threaded on the connecting ring and having a radial flange adapted to engage the outer portions of the flanged heads of the said bearing blocks.

7. In a universal joint, the combination, with a driving and a driven member and trunnions carried thereby, of a hollow lubricant-containing connecting ring for said trunnions, the said ring having seats extending transversely thereof from one side toward and terminating short of the opposite side, the cross section of each of said seats constituting a segment of a circle in excess of 180° with the arc of such segment defined by the intersection of the seat with the inner wall of the ring, bearing blocks for said trunnions having cross sections corresponding in shape to the said seats and adapted to be inserted in said seats, each bearing block having a flanged head at the outer end thereof, a washer interposed between said flange and the face of the ring adjacent thereto, and a clamping ring threaded on the connecting ring and having a radial flange adapted to engage the heads of the said bearing blocks.

8. In a universal joint, the combination, with a driving and a driven member and trunnions carried thereby, of a hollow lubricant-containing connecting ring for said trunnions, the said ring having seats extending transversely thereof from one side and terminating short of the opposite side, the cross section of each of said seats constituting a segment of a circle in excess of 180° with the arc of such segment defined by the intersection of the seat with the inner wall of the ring, bearing blocks for said trunnions having cross sections corresponding in shape to the said seats, and adapted to be inserted in said seats, each bearing block having a flanged head at the outer end thereof and a reduced extension adapted to engage the inner end of a seat and providing a segmental annulus about such extension, a washer interposed between the flange of each head and the face of the ring adjacent thereto, a washer on each seat surrounding each extension, and means mounted on said ring and cooperating with the said heads for holding the said blocks to their seats.

9. In a universal joint, the combination, with a driving and a driven member and trunnions carried thereby, of a hollow lubricant-containing connecting ring for said trunnions, the said ring having seats extending transversely thereof from one side toward and terminating short of the opposite side, the cross section of each of said seats constituting a segment of a circle in excess of 180°, with the arc of such segment defined by the intersection of the seat with the inner wall of the ring, bearing blocks for said trunnions having cross sections corresponding in shape to the said seats and adapted to be inserted in said seats, each bearing block having a flanged head at the outer end thereof and a reduced extension adapted to engage the inner end of a seat and providing a segmental annulus about such extension, a washer interposed between the flange of each head and the face of the ring adjacent thereto, a washer on each seat surrounding each extension, and a clamping ring threaded on the connecting ring and having a radial flange adapted to engage the outer portions of the flanged heads of the said bearing blocks.

10. In a universal joint, the combination, with a driving and a driven member and trunnions carried thereby, of a hollow lubricant-containing connecting ring for said trunnions, the said ring having seats extending transversely thereof, the said seats extending from and through one side of said ring transversely thereof toward and in proximity to the opposite side thereof, bearing blocks for said trunnions adapted to be inserted in said seats through the openings provided in one side of said ring, and means for securing the said bearing blocks in place in said ring.

11. In a universal joint, the combination, with a driving and a driven member and trunnions carried thereby, of a hollow lubricant-containing connecting ring for said trunnions, the said ring having seats extending from and through one side of said ring transversely thereof toward and in proximity to the opposite side thereof, bearing blocks for said trunnions adapted to be inserted in said seats through the openings provided in one side of said ring, each of said bearing blocks and seats being so shaped as to permit of a rocking movement of each bearing block within its seat, and means for securing the said bearing blocks in place in said ring.

12. In a universal joint, the combination, with a driving and a driven member and trunnions carried thereby, of a hollow lubricant-containing connecting ring for said trunnions, the said ring having seats extending from and through one side of said ring transversely thereof toward but terminating short of the opposite side and intersecting the inner side or face of said ring, bearing blocks adapted to be inserted in said seats through the openings provided in one side of said ring, each of said bearing blocks and seats being so shaped as to enable each block to rock in its seat and each block having a radial bore for a trunnion, the bore being adapted to register with the opening formed by the intersection of its seat with the inner face of the ring, and means for securing the said blocks in place within their seats.

In testimony whereof, I hereunto affix my signature.

FREDERICK W. PETERS.